United States Patent [19]

Morgan

[11] 4,342,466
[45] Aug. 3, 1982

[54] SCOOTER WITH SEAT

[75] Inventor: Daniel Morgan, Long Beach, Calif.

[73] Assignees: Irving Bullet, Jr., Carson; Maurice M. Decuir, Long Beach, both of Calif. ; part interest to each

[21] Appl. No.: 119,872

[22] Filed: Feb. 8, 1980

[51] Int. Cl.³ .................... B62B 7/04; B62M 29/00
[52] U.S. Cl. .................... 280/87.03; 16/DIG. 33; 280/87.04 R; 280/279
[58] Field of Search .................... 280/7.1, 7.15, 47.34, 280/87.04 R, 275, 87.2, 780, 97, 86, 87.02 R, 270, 276, 274, 279, 87.01, 87.03, 271; 16/180, DIG. 13, DIG. 33; 296/146

[56] References Cited

U.S. PATENT DOCUMENTS

| | | | |
|---|---|---|---|
| 1,377,948 | 5/1921 | Wacker | 280/87.04 R |
| 1,725,838 | 8/1929 | Weber | 280/87.02 R |
| 3,140,100 | 7/1964 | Nichols et al. | 280/87.04 R |
| 3,212,791 | 10/1965 | Edwins | 280/279 X |
| 4,095,816 | 6/1978 | Langieri | 280/87.02 R |
| 4,129,317 | 12/1978 | Bell | 280/274 X |
| 4,179,135 | 12/1979 | Slater | 280/276 |

Primary Examiner—David M. Mitchell
Attorney, Agent, or Firm—Charles H. Thomas

[57] ABSTRACT

A foot propelled land craft is provided with a steering post and body section coupled together by a resilient, elastic length of material which serves as both a hinge for steering and as a shock absorber. The body section has a seat located above a deck. Preferably fenders are provided at either side of the front of the body section to fend off branches or foliage which may project into the path of travel.

8 Claims, 6 Drawing Figures

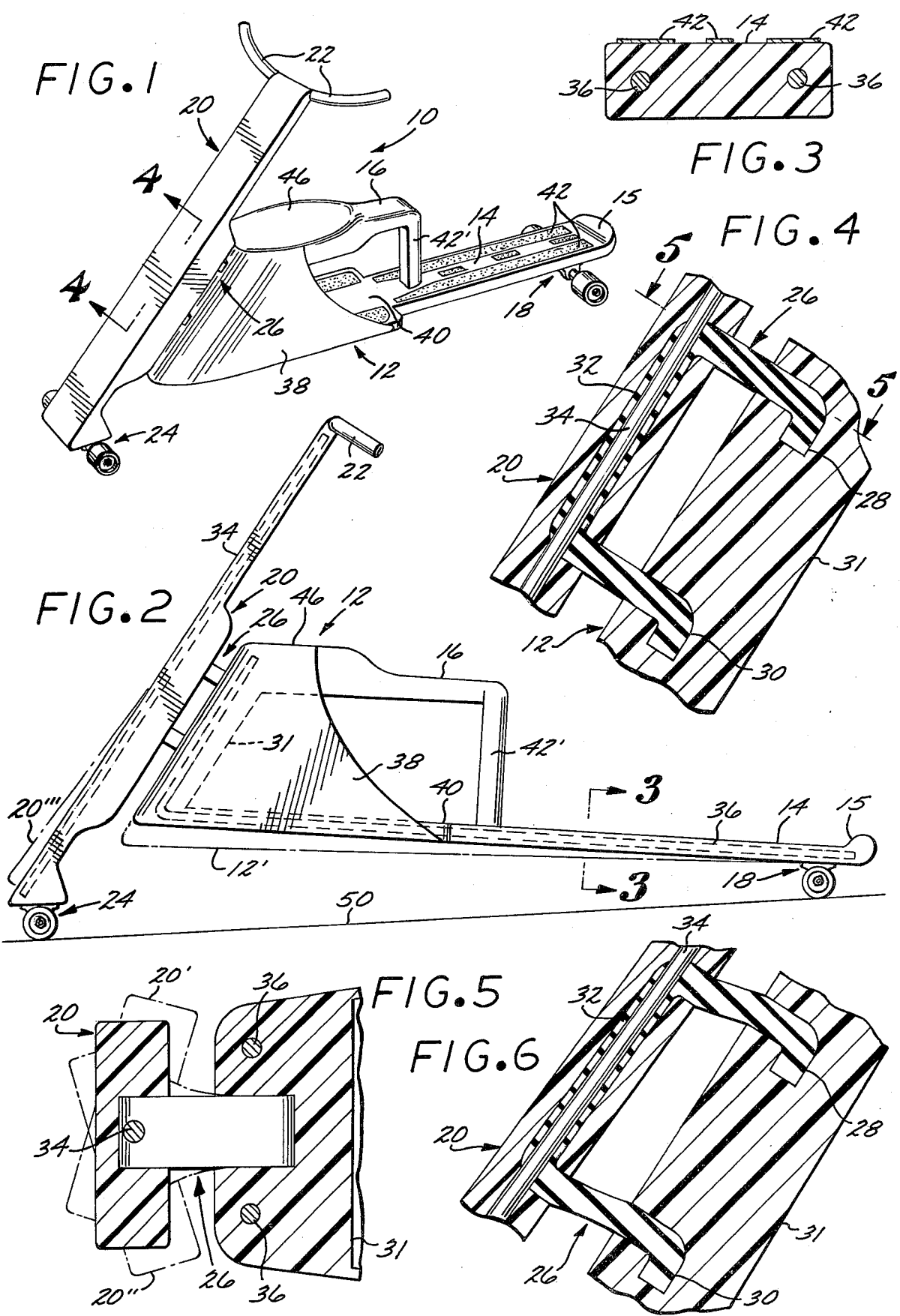

SCOOTER WITH SEAT

BACKGROUND OF THE INVENTION

1. Field of the Invention

The present invention relates to nonmotorized, foot propelled scooters for use either by children or adults.

2. Description of the Prior Art

Various types of scooters with seats have been designed in the past. Virtually all conventional foot propelled scooters involve a forward section in the form of a steering post and a rear section having a flat, longitudinal deck, and in many cases a seat located above the deck. The steering post and body section of conventional scooters are typically coupled together by means of metal hinges in which a shaft or pintles are encircled by sleeves which allow rotation of the steering post relative to the body section. While such metal hinge type connections do allow the scooter rider to turn the handlebars of the scooter to alter the direction of travel, conventional hinge connections are not biased to return the steering post to a disposition in which the scooter travels forward in a straight line. Furthermore, conventional hinge couplings do not serve to smooth the ride of the scooter as it travels.

SUMMARY OF THE INVENTION

The present invention is a foot propelled land craft having a unique and advantageous hinge arrangement which couples a forward steering post to a body section located behind the steering post. The scooter of the invention is formed with a body section that has a flat deck and a seat mounted above the deck. A pair of spaced apart wheels are mounted beneath the rear extremity of the deck. A steering post is provided having handlebars at its upper extremity and a pair of spaced apart wheels at its lower extremity. A unique hinge arrangement is formed by a length of a resilient, elastic material, such as rubber, which is partially embedded in the body section and partially embedded in the steering post to join these two components together.

As the scooter travels, the elastic hinge tends to hold the front wheels of the vehicle in alignment for travel in a straight line in a forward direction by holding the steering post in the appropriate orientation. The rider is able to turn the steering post using the handlebars to deviate from a straight path of travel without any significant difficulty in order to turn a corner or for any other reason change the course of direction of the scooter. However, because of the bias toward a forward orientation, an increasing amount of force is required to turn the handlebars to execute an extremely sharp turn. This characteristic serves as a safety feature, as it tends to restrict the degree to which the steering post can be turned, and thereby prevent the wheels at the lower extremity of the steering post from being turned so far that they either lock or skid. The hinge of the invention thereby tends to prevent the sections of the scooter from "jack knifing".

A further feature of the unique hinge construction according to the invention is that the flexing action of the hinges is omnidirectional. Accordingly, the hinge in the scooter of the invention serves as a shock dampening mechanism to cushion the ride of the scooter. Rocks, bumps, uneven divisions between pavement sections, or other small obstructions in the path of the scooter transmit a jarring motion to the scooter wheels, as with conventional scooters. However, because of the resilient, elastic hinge, the energy transmitted by the sudden shocks is at least partially absorbed by the hinge mechanism, which yields slightly in an elastic fashion.

Preferably, the scooter is constructed with fenders shaped generally as flared fins which extend outwardly and rearwardly at the front of the body section of the scooter above the deck. The flat deck is of expanded width between the fenders, so as to accomodate placement of the rider's feet while coasting. The fenders thereby serve to protect the rider's feet and ankles from branches and brush which may protrude into the path of the vehicle. Also, the fenders protect the rider's clothing and legs from water which may be splashed up by the front wheels of the scooter as the rider coasts through a puddle on pavement.

The invention may be described with greater clarity and particularly by reference to the accompanying drawings.

DESCRIPTION OF THE DRAWINGS

FIG. 1 is a perspective view of a scooter according to the invention.

FIG. 2 is a side elevational view of the scooter depicted in FIG. 1.

FIG. 3 is a sectional elevational view taken along the lines 3—3 of FIG. 2.

FIG. 4 is a sectional elevational detail of the hinge of the invention taken along the lines 4—4 of FIG. 1.

FIG. 5 is a sectional detail taken along the lines 5—5 of FIG. 4.

FIG. 6 is a sectional detail analogous to FIG. 4 and showing the shock absorbing action of the scooter hinge.

DESCRIPTION OF THE EMBODIMENT

FIG. 1 depicts a foot propelled scooter 10 which is constructed with a body section 12 having an elongated, relatively narrow generally flat deck portion 14 with a raised generally flat straddle type seat 16 mounted above the deck 14. At the underside of the rearmost extremity, or tail 15 of the deck 14 there is a pair of rear wheels 18. In front of the body section 12 there is an elongated, inclined steering post 20 which has a pair of transversely disposed arcuately curved handlebars 22 at its upper extremity and a pair of front wheels 24 mounted at its lower extremity. As illustrated in FIGS. 2, 4 and 5 there is a length of a resilient, elastic material, such as rubber, of generally bar-shaped configuration which is configured as illustrated in FIG. 4 to form a hinge 26. As illustrated in FIG. 4, the hinge 26 is configured with both its upper and lower end extremities 28 and 30, respectively, embedded in the upright, thickened forward portion 31 of the body section 12, one above the other. An intermediate portion 32 of the hinge 26 is embedded in the steering post 20.

Both the body section 12 and the steering post 20 are preferably solid plastic structures, each formed in separate adjacent mold sections of a unitary mold with the hinge 26 in position to extend between the mold sections so that it becomes partially embedded in both the body section 12 and the steering post 20. The body section 12 and steering post 20 may be injection molded, compression molded, cast or otherwise fabricated. The body section 12 and steering post 20 may be formed from a variety of strong, tough plastics, such as polyvinyl chloride, ABS, acrylic resins, epoxy resins, or other available plastic substances.

To increase the strength of the component parts of the scooter 10, it may be advisable to cast the plastic sections with separate, metal reinforcing rods. As illustrated in FIGS. 2, 4 and 5, a single elongated steel rod 34 is provided and is entirely encapsulated within the steering post 20. The steel rod 34 is approximately ⅜ inch in diameter and extends from near the handlebars 22 to adjacent the lower extremity of the steering post 20 at which the wheels 24 are attached. As illustrated in FIGS. 4 and 6, the rod 34 in the steering post 20 passes directly and longitudinally through the intermediate section 32 of the hinge 26, throughout the length of the this intermediate section. Similarly, a pair of spaced apart parallel steel rods 36 are embedded in the structure of the body section 12 of the scooter 10, as illustrated in FIGS. 2, 3 and 5. The metal rods 36 extend from the tail 15 of the deck 14 forward throughout the length of the deck, and are bent in an angle upwardly to pass behind the end extremities 28 and 30 of the hinge 26 within the structure of upright thickened forward portion 31 of the body section 12. By using the reinforcing rods 34 and 36, the scooter 10 is strengthened so that the major plastic structures thereof are unlikely to break into pieces, even when subjected to extremely great impacts.

The hinge 26 is preferably constructed of a hard rubber, although certain flexible plastics are also suitable. The configured length of rubber forming the hinge 26 is generally of rectangular cross section, wider than it is thick.

The dynamic action of the hinge 26 is depicted in FIGS. 5 and 6. The rider may manipulate the steering post 20 to alter the course of direction of the scooter 10 by twisting the handlebars 22. When the handlebars 22 are twisted to the right, the hinge 26 flexes and allows the steering post 20 to assume the position indicated in dashed lines at 20' in FIG. 5. In this position the front wheels 24 are directed slightly to the right. Manipulation of the handlebars 22 in the opposite direction turns the steering post to the left to the position depicted by dashed lines as 20" in FIG. 5. Because of the resilient nature of the hinge 26, an increased application of force is required to twist the steering post 20 to an extreme degree to either the right or left, as the force on the handlebars 22 is countered by increased resistance within the structure of the hinge 26 itself. This tends to prevent the hinge 26 from being twisted to orientations beyond those depicted at 20' and 20" which might well be dangerous.

The hinge 26 also serves as a damping mechanism, both as a spring and as a shock absorber, as depicted in FIG. 6. Should either the front wheels 24 or the rear wheels 18 strike a bump or small obstruction in the road, the jarring force will be transmitted to either the steering post 20, or the body section 12. The hinge 26 flexes as depicted in FIG. 6 to prevent this force from being carried through to the other portion of the scooter. The body section 12 and steering post 20 are thereby able to flex relative to each other to the positions depicted in dashed lines at 12' and 20'" respectively in FIG. 2. This tends to stabilize the land craft and aids in preventing the rider from losing control of the vehicle. The energy from the impact by the road obstruction is partially absorbed by the hinge 26 as it returns from a vertically flexed orientation, as depicted in FIG. 6, to its normal alignment depicted in FIG. 4.

As illustrated in FIGS. 1 and 2, the body section 12 is formed with a pair of fin shaped fenders 38 which flair outwardly and rearwardly from the forward extremity of the body section 12 adjacent the attachment of the hinge 26. The fenders 38 are formed to narrow downwardly toward the deck 14. The deck 14 is of an expanded width in the area 40 between the fenders 38. The upper surface of the deck 14 includes adhesively joined sections of a skid tape, arranged in both a functional and an attractive fashion as indicated at 42. The tail 15 of the deck 14 is turned slightly upward in a "kick-tail" configuration as depicted in FIGS. 1 and 2.

The seat 16 is supported at its rear edge by an upright post 42' which curves forwardly at an elbow to form the seat 16. The forward region 46 of the elevated structure of the body section 12 joins the thickened section 31, as depicted in FIG. 2. By supporting the seat 16 at the forward region 46 and by the rearwardly located post 42', the intermediate widened area 40 of the deck 14 is unobstructed, so that the rider is able to easily place his feet in this area in protected fashion behind the fenders 38.

The steering post 20 is oriented at an inclined angle relative to the rolling surface 50 depicted in FIG. 2. Preferably, the angle of inclination is far less than 90°, and preferably is no greater than about 60°. Orientation in this fashion positions the forward wheels 24 well ahead of the rider, so that the rider is protected from any impact from an upright construction which the scooter 10 may suffer. The hinge 26 is sensitive to omnidirectional forces, so that an impact on the wheels from any direction is at least partially absorbed within the structure of the hinge 26. The unique configuration of the hinge 26 thereby reduces the severity of any impact on the scooter 10 to the rider.

The wheels 18 and 24 are each formed by a pair of spaced apart, urethane wheels, mounted by bearing races on trucks fastened by screws to the underside of the tail 15 of the deck 14 and to the underside of the lower end of the steering post 20. Trucks and wheels of this type are conventionally used on skateboards.

The overall construction of the scooter 10 provides a vehicle which exhibits flexible, spring action, mobile fluid steering, and a vehicle which can travel at an exhilarating speed. Moreover, because of the solid construction and unique configuration of the hinge 26, the scooter 10 is extremely safe.

The scooter 10 may be constructed in a variety of sizes. The seat 16 may be located, for example, as low as 18 inches above the rolling surface 50 in a model designed for use by small children, or as high as 3 feet above the rolling surface 50 in larger models designed for use by adults.

To use the scooter 10, an individual grasps the handlebars 22 with one foot placed in the intermediate area 40 of the deck 14 just inside the rear extremity of the adjacent fender 38. The rider stands while using the opposite foot to pump the scooter forward to gain speed. When sufficient speed has been achieved, the rider normally ceases pumping and places both feet in the protected area 40 inside the protective confines of the fenders 38 while the scooter 10 coasts. The rider uses the handlebars 22 to turn the scooter 10, thereby orienting the steering post 20 to the orientation depicted at 20' in FIG. 5, or to the left to the orientation indication at 20", to turn right, or left, respectively. When traveling over small pebbles, or cracks in a concrete sidewalk, the hinge 26 exhibits the shock absorbing reaction to impacts as depicted in FIG. 6. The steering post 20 and the body section 12 respond as indicated at 20''' and 12', respectively, in FIG. 2.

While but a single embodiment of the invention has been depicted, it should be understood that numerous forms of the invention are possible. For example, foot brakes and other accessories may be added. Accordingly, the scope of the invention should not be considered as limited to the specific embodiment depicted, but rather is defined in the claims appended hereto.

I claim:

1. A scooter comprising:
   a body section having a deck and a seat carried above said deck and having a pair of spaced apart wheels mounted beneath the rear extremity of said deck,
   a steering post positioned in front of said body section and having handlebars at its upper extremity and a pair of spaced apart wheels at its lower extremity, and
   a resilient, elastic rubber hinge partially embedded in both said body section and said steering post to join said body section and said steering post together.

2. A scooter according to claim 1 further characterized in that said hinge is formed of a length of homogeneous flexible rubber.

3. A scooter according to claim 2 further characterized in that said hinge is configured with both of its end extremities embedded in one of said body section and said steering post, one end extremity above the other, and with an intermediate portion embedded in the other of said body section and steering post.

4. A scooter according to claim 3 further characterized in that said body section and said steering post are formed of plastic.

5. A scooter according to claim 4 further comprising separate metal reinforcing means extending through the length of each of said body section and said steering post.

6. A scooter according to claim 3 further comprising fenders extending outwardly and rearwardly at the front of said body section above said deck, and said deck is of expanded width between said fenders.

7. A scooter according to claim 5 further characterized in that said seat is supported from the front of said body section and by a post located beneath said seat, thereby leaving an intermediate unobstructed area of said deck forward of said seat.

8. A scooter according to claim 3 further characterized in that said steering post is inclined at an angle of no greater than about 60° relative to a rolling surface for said wheels.

* * * * *